United States Patent
Park

(10) Patent No.: US 9,979,241 B2
(45) Date of Patent: May 22, 2018

(54) ELECTRONIC DEVICE AND METHOD FOR SHARING ELECTRIC POWER IN WIRELESS CHARGING

(71) Applicant: Samsung Electronics Co., Ltd, Gyeonggi-do (KR)

(72) Inventor: Soon-Sang Park, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 14/932,831

(22) Filed: Nov. 4, 2015

(65) Prior Publication Data

US 2016/0126779 A1  May 5, 2016

(30) Foreign Application Priority Data

Nov. 4, 2014  (KR) .......................... 10-2014-0152256

(51) Int. Cl.
*H01M 10/44* (2006.01)
*H01M 10/46* (2006.01)
*H02J 50/80* (2016.01)

(52) U.S. Cl.
CPC .................. *H02J 50/80* (2016.02)

(58) Field of Classification Search
CPC .......... H02J 7/025; H02J 5/005; H02J 7/0003; H02J 7/0004; H02J 7/0008; H02J 7/0091
USPC .................. 320/103, 107, 108, 114; 307/104
See application file for complete search history.

(56) References Cited

U.S. PATENT DOCUMENTS

| | | | | |
|---|---|---|---|---|
| 9,722,460 | B2 * | 8/2017 | Yang | H02J 50/12 |
| 2011/0127954 | A1 * | 6/2011 | Walley | H01M 2/0267 |
| | | | | 320/108 |
| 2013/0043738 | A1 * | 2/2013 | Park | H04M 1/7253 |
| | | | | 307/104 |
| 2013/0310112 | A1 | 11/2013 | You et al. | |
| 2015/0042264 | A1 * | 2/2015 | Leabman | H02J 17/00 |
| | | | | 320/108 |
| 2015/0050963 | A1 * | 2/2015 | Rokusek | G06F 1/266 |
| | | | | 455/566 |
| 2015/0349572 | A1 * | 12/2015 | McCoy | H02J 7/025 |
| | | | | 320/103 |
| 2016/0049993 | A1 * | 2/2016 | McCoy | H04B 5/0037 |
| | | | | 307/104 |

FOREIGN PATENT DOCUMENTS

| | | |
|---|---|---|
| KR | 10-2013-0020021 | 2/2013 |
| KR | 10-2013-0129745 | 11/2013 |
| KR | 10-2014-0007237 | 1/2014 |
| KR | 10-2014-0007775 | 1/2014 |

* cited by examiner

*Primary Examiner* — Edward Tso

(57) ABSTRACT

A method for sharing, at a first electronic device, wireless power with a second electronic device is provided. The method includes performing connection with the second electronic device; obtaining power-related information of the second electronic device; determining a power state of the second electronic device based on the power-related information of the second electronic device; determining an amount of electric power to be transmitted to the second electronic device based on the power state of the second electronic device; and transmitting the electric power of the determined amount to the second electronic device. Charging is enabled anytime, anywhere, as long as there is an electronic device to share electric power, thereby increasing user convenience.

20 Claims, 16 Drawing Sheets

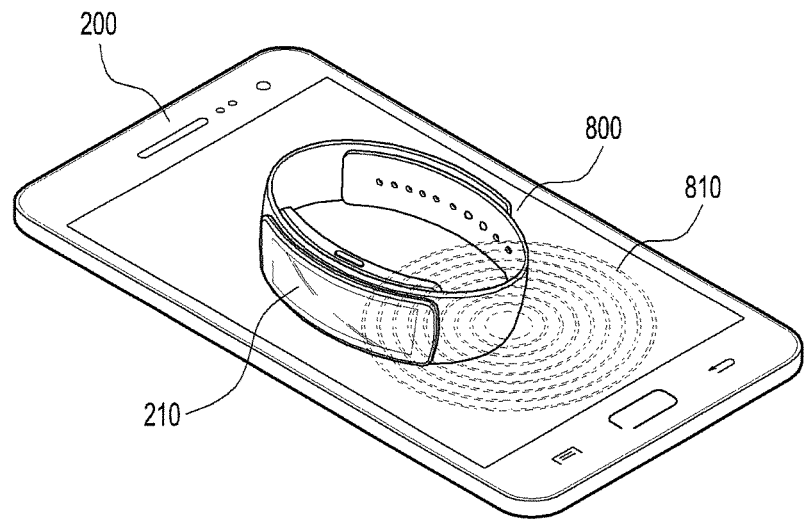
FIG.8A
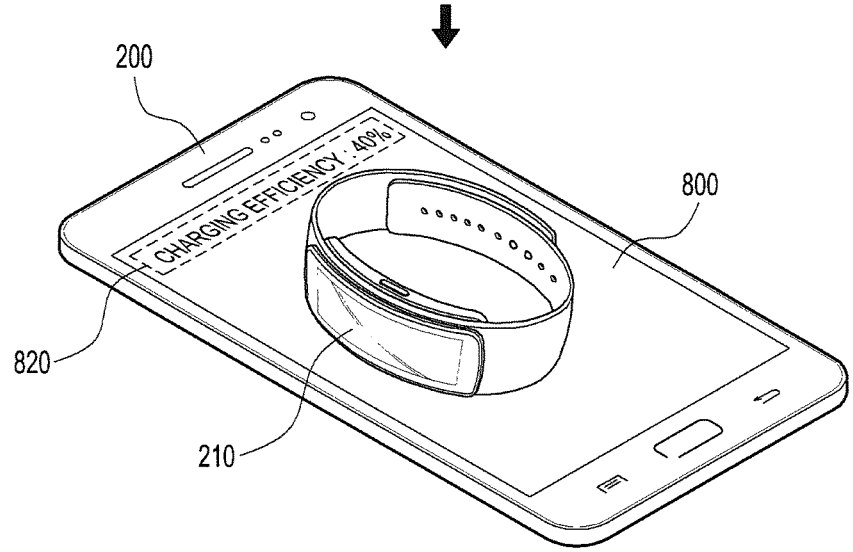
FIG.8B

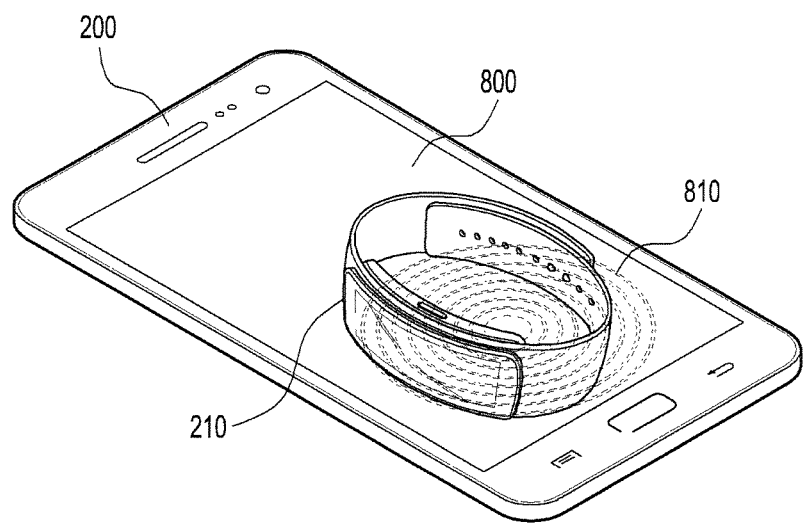
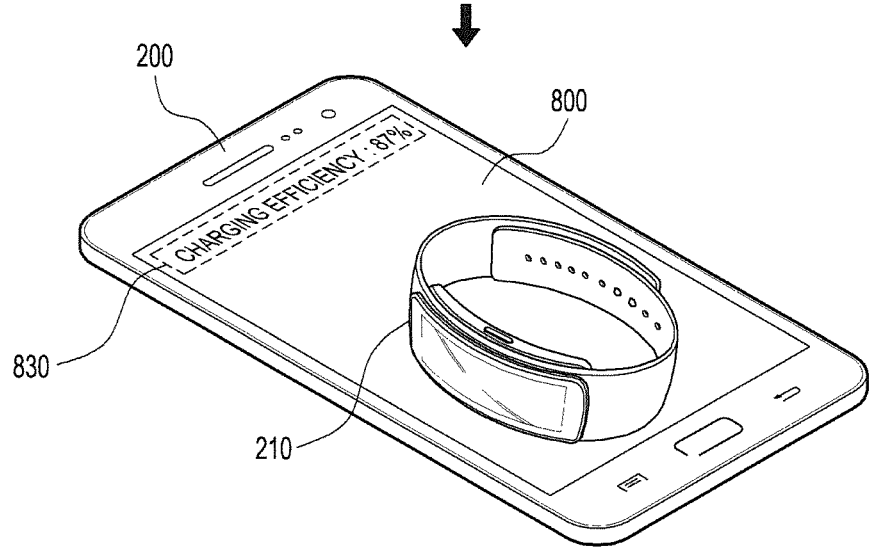
FIG.9A
FIG.9B

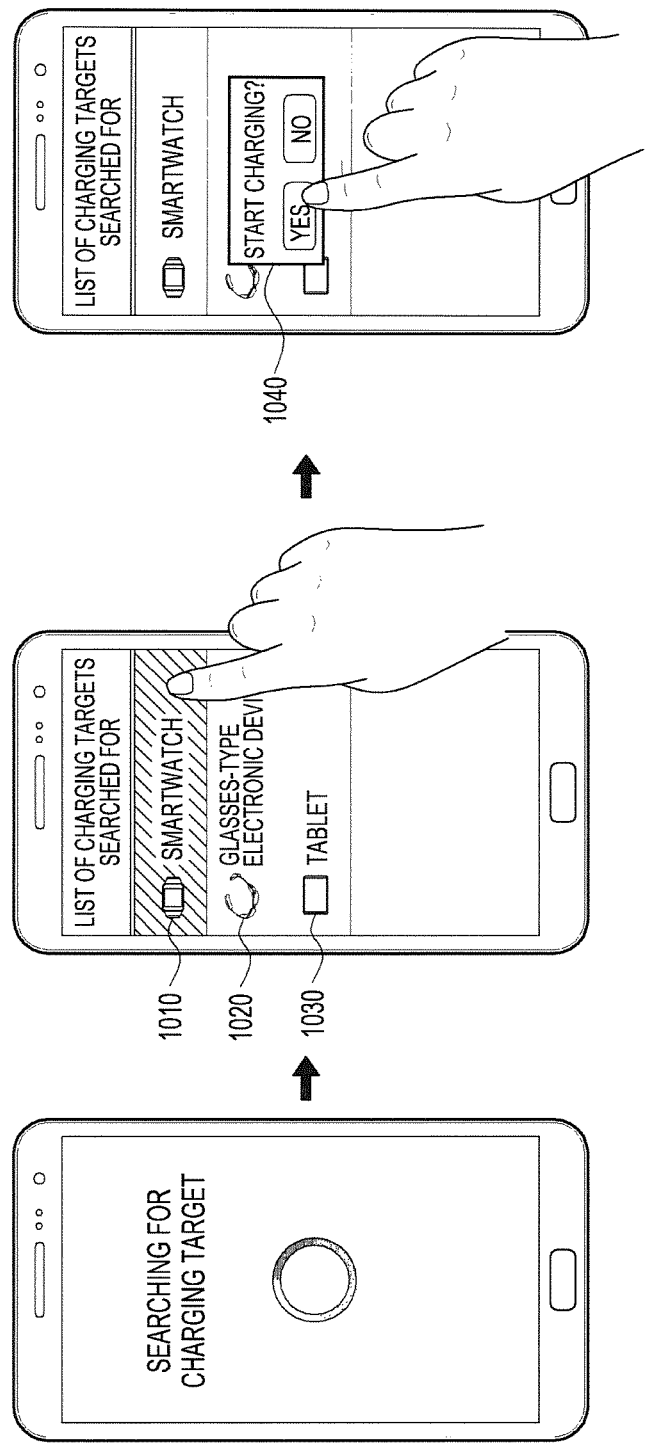

ELECTRONIC DEVICE AND METHOD FOR SHARING ELECTRIC POWER IN WIRELESS CHARGING

CROSS-REFERENCE TO RELATED APPLICATION(S) AND CLAIM OF PRIORITY

The present application is related to and claims the benefit under 35 U.S.C. § 119(a) of a Korean patent application filed on Nov. 4, 2014 in the Korean Intellectual Property Office and assigned Serial No. 10-2014-0152256, the entire disclosure of which is incorporated hereby incorporated by reference.

TECHNICAL FIELD

Various embodiments of the present disclosure relate to an electronic device and method for sharing electric power in wireless charging.

BACKGROUND

Electronic devices, such as smart phones, tablet Personal Computers (PCs), or the like are powered by rechargeable batteries, and they need separate charging devices to recharge the batteries. In this regard, charging the batteries with a cable gives inconvenience to the user because it is difficult to recharge the battery outdoors and the cable always needs to be carried. To address this problem, wireless charging or contactless charging technologies have recently been developed and applied to many different electronic devices. The wireless charging technology using wireless power transmission and reception enables the battery to be automatically charged without need for a separate charging connector. Wireless charging improves the waterproof function and portability of electronic devices because there is no need for a wired charger, and thus significant developments of related technologies are expected in coming age of electric cars. Accordingly, a need exists for a wireless charging scheme to maximize portability of the electronic device and allow the electronic device to be charged anywhere.

SUMMARY

To address the above-discussed deficiencies, it is a primary object to provide an electronic device and method for sharing electric power among electronic devices. Furthermore, various embodiments of the present disclosure provide an electronic device and method for setting a charging amount through a charging scheme that is irrelevant to the size, type, or the like, of the electronic device.

In a first embodiment, a method for sharing, at a first electronic device, wireless power with a second electronic device is provided. The method includes performing connection with the second electronic device; obtaining power-related information of the second electronic device; determining a power state of the second electronic device based on the power-related information of the second electronic device; determining an amount of electric power to be transmitted to the second electronic device based on the power state of the second electronic device; and transmitting the electric power of the determined amount to the second electronic device.

In a second embodiment, first electronic device for sharing electric power with a second electronic device is provided. The first electronic device includes a communication interface configured to obtain power-related information of the second electronic device if the first electronic device is connected to the second electronic device; a processor configured to: determine a power state of the second electronic device based on the power-related information of the second electronic device, and determine an amount of electric power to be transmitted to the second electronic device; and a power transmitter configured to transmit the electric power to the second electronic device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A, 8B, 9A, and 9B show example charging efficiencies that vary by positions where an electronic device on the power receiving side lies on an electronic device on the power transmitting side according to this disclosure;

FIGS. 10A, 10B, and 10C show example screens accompanied by searching operations for a charging target according to this disclosure;

Throughout the drawings, like reference numerals will be understood to refer to like parts, components, and structures.

DETAILED DESCRIPTION

Figure 1:
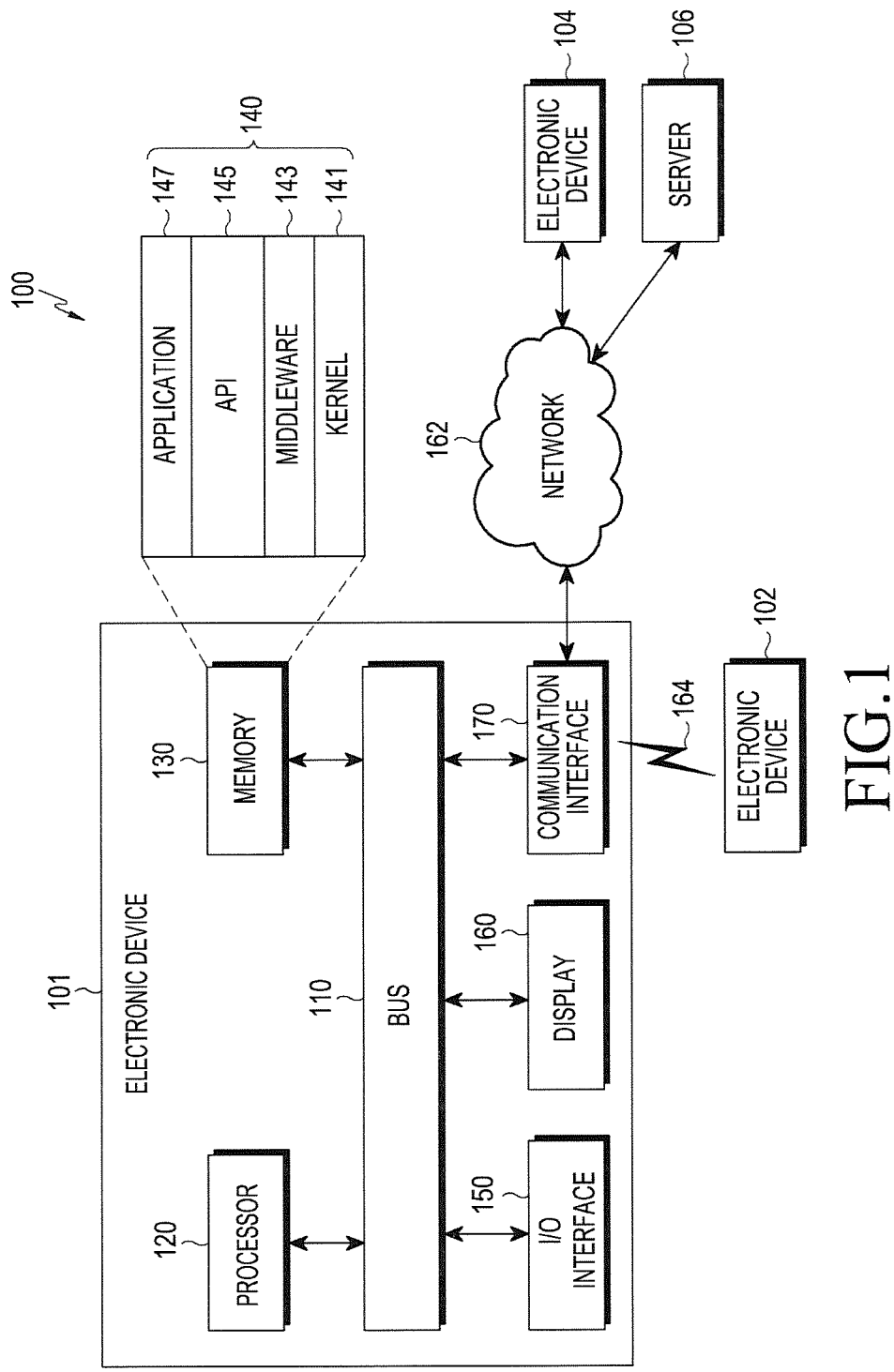
FIG. 1 shows an example network environment including an electronic device according to this disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description provides various embodiments of the present disclosure with reference to the accompanying drawings. This disclosure should not be construed as limited to the embodiments set forth herein, and may be understood as including their modifications, equivalents, or alternatives.

Like numbers refer to like elements throughout the drawings. The terms "have", "having", "comprise", or "comprising" as herein used specify the presence of disclosed functions, operations, or components, but do not preclude the presence or addition of one or more other functions, operations, or components. As used herein, the term "A or B", "at least one of A and/or B", or "one or more of A or B" includes any and all combinations of one or more of the associated listed items. For example, "A or B", "at least one of A and B", or "at least one of A or B" may indicate (1) at least A, (2) at least B, or (3) at least A and at least B. Ordinal numbers as herein used, such as "first", "second", or the like, can modify various components in various embodiments, but the modification can be done irrespective of order or importance of the components and may not be limited to those components. These terms are only used to distinguish one element, component, region, layer or section from another. For example, first user equipment (UE) and second UE can refer to different UEs irrespective of their order or importance.

For example, a first element, component, region, layer or section could be termed a second element, component, region, layer or section without departing from the teaching of the embodiments of the present disclosure. When a component (e.g., first component) is operatively or communicatively coupled with/to or connected to another component (e.g., second component) is used, it is to be understood that the first component is directly connected or coupled to the second component or is indirectly connected or coupled to the second component via another new component (such as a third component). However, if a component (such as a first component) is said to be "directly connected" or "directly coupled" to another component (such as a second component), it should be interpreted as literally as it says without intervening another new component (such as a third component) between the first and second components.

The expression "configured to" as herein used can be interchangeably used with "suitable for", "having the capacity to", "designed to", "adapted to", "made to", or "capable of" according to the given situation. The expression "configured to" may not necessarily mean "specifically designed to" in terms of hardware. Rather, it may refer to "able to cooperate with" under a certain situation. For example, "a processor configured to perform A, B and C functions" may refer to a dedicated processor, such as an embedded processor for performing A, B and C functions, or a general purpose processor, such as a Central Processing Unit (CPU) or an application processor that may perform A, B and C functions by executing one or more software programs stored in a memory.

Terms as herein used are merely used for the purpose of explaining some embodiments of the present disclosure and not intended to limit the present disclosure to the embodiments. As used herein, the singular forms "a", "an" and "the" are intended to include the plural forms as well, unless the context clearly indicates otherwise. All terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the embodiments of the present disclosure.

An electronic device according to various embodiments of the present disclosure may include at least one of smart phones, tablet Personal Computers (PCs), mobile phones, video phones, e-book readers, desktop PCs, laptop PCs, netbook computers, workstations, servers, Personal Digital Assistants (PDAs), Portable Multimedia Players (PMPs), MP3 players, mobile medical devices, cameras, and wearable devices (such as smart glasses, Head-Mounted Devices (HMDs)), electronic clothes, electronic bracelets, electronic necklaces, electronic appcessories, electronic tattoos, smart mirrors, and smart watches.

In some embodiments, the electronic device is a smart home appliance. The smart home appliance may include at least one of such as televisions, Digital Video Disc (DVD) players, audio systems, refrigerators, air conditioners, cleaning machines, ovens, microwaves, washing machines, air purifiers, set-top boxes, home automation control panels, security control panels, TV sets (such as SAMSUNG HOMESYNC®, APPLE TV®, or GOOGLE TV®), game consoles (such as XBOX®, PLAY STATION®), electronic dictionaries, electronic keys, camcorders, and electronic albums.

In some embodiments, the electronic device may include at least one of a variety of medical equipment (such as various portable medical meters (such as blood sugar meters, heart rate meters, blood pressure meters, clinical thermometers, or the like), Magnetic Resonance Angiography (MRA), Magnetic Resonance Imaging (MRI), Computed Tomography (CT), photographing devices, ultrasonic devices, or the like), navigation devices, Global Positioning System (GPS) receivers, Event Data Recorders (EDRs), Flight Data Recorders (FDRs), car infotainment devices, marine electronic devices (such as marine navigation systems, gyro-compass, or the like), avionics, security devices, car head units, industrial or home robots, banking agency's Automatic Teller Machines (ATMs), Point of Sales (POSs) for shops, and devices for Internet of things (such as bulbs, various sensors, electricity or gas meters, sprinklers, fire alarms, thermostats, street lamps, toasters, health machines, hot-water tanks, heaters, boilers, or the like).

In some embodiments, the electronic device may include at least one of part of a furniture or building/structure, electronic boards, electronic signature receiving devices, projectors, and various instrumental equipment (such as meters for water, electricity, gas, or radio waves). The electronic device in accordance with various embodiments of the present disclosure is a combination of one or more of the aforementioned devices. In some embodiments, the electronic device is a flexible electronic device. The electronic device is not limited to what are described above, but may include a device that would emerge in the future with the advancement of technology.

An electronic device according to various embodiments of the present disclosure will now be described with reference to accompanying drawings. The term "user" as herein used may refer to a person who uses the electronic device or a device (such as an artificially intelligent device) that uses the electronic device.

FIG. 1 shows an example electronic device 101 in a network environment 100 according to this disclosure. The electronic device 101 includes a bus 110, a processor 120, a memory 130, an input/output (I/O) interface 150, a display 160, and a communication interface 170. In some embodiments, the electronic device 101 omits at least one of the components, or additionally includes some other component(s). The bus 110 includes a circuit to connect the components 110 to 170 to one another, and deliver communications (such as control commands or data) among the components 110 to 170. The processor 120 includes one or more of CPUs, Application Processors (APs) or Communication Processors (CPs). The processor 120 performs an operation or data processing related to control or communications of at least one of the other components of the electronic device 101.

The processor 120 is also referred to as a controller or includes a controller as its part. In another embodiment, the processor 120 includes a memory 130 for storing information required by the processor 120. The processor 120 (hereinafter also referred to as a controller) is a central processing unit to control general operations of the electronic device 101 and performs operations of a method for sharing electric power in wireless charging as will be discussed herein.

In an embodiment, as a charging management application runs, the controller drives the communication interface 170 to search for another electronic device to share electric power with. Through the communication interface 170, the controller searches for nearby electronic devices enabled for electric power reception based on a short-range wireless communication scheme, and controls the display 160 to display information about at least one electronic device searched for. As such, an electronic device 102 on the power receiving side is searched for as a charging target based on a short-range wireless communication scheme, and the electronic device 101 transmits power 164 to the nearby electronic device 102 to share the power with. In this regard, a discovery operation to discover a nearby electronic device is performed based on the short-range wireless communication scheme, and information about at least one electronic device searched for through the discovery operation, such as identification (ID) is known.

Accordingly, respective objects corresponding to the at least one electronic device searched for is displayed on the display 160, which is represented by various visual objects, such as icons, photos, text, images, or the like. If one of the respective objects that represent the at least one electronic device is selected, the controller performs connection with the selected electronic device. Subsequently, connected with the selected electronic device, the controller obtains power-related information of the connected electronic device by sending a request for the power-related information to the electronic device. The power-related information includes at least a piece of information about identification of a charging target, battery state of the charging target, consumption power per application based on running time, and charging efficiency. Based on the obtained power-related information (or power management information), the controller displays a power state of the connected electronic device, which is a charging target, on the display 160.

In an embodiment, the controller displays the power state of the charging target on the display 160, to allow the user to figure out how much electric power is required by the target device to perform a certain function. The controller receives an amount of power to be charged for the charging target from the user through the I/O interface 150. With the input of the amount of power to be charged, the controller recalculates the power state of the charging target on the display 160. Accordingly, the user understands at a glance how much electric power is required to perform a desired function.

The controller then transmits as much electric power as determined by the user, and when the power transmission as much is completed, such as when a target charging amount is reached, the controller stops power transmission. By doing this, in the perspective of the electronic device for transmitting electric power, limited electric power of the electronic device to distribute electric power is efficiently shared because the electronic device is able to stop power transmission after transmitting as much electric power as required. While transmitting the power, the controller displays a transmit power state on the display 160. The transmit power state includes information about progress in power transmission, such as at least one of the remaining amount of electric power to a total amount of electric power transmitted, time taken to progress power transmission, and strength of the transmit power.

The electronic device 101 on the power transmitting side may efficiently transmit electric power to an electronic device on the power receiving side, by calculating an amount of electric power required for the electronic device on the receiving side to perform a particular function based on the power-related information of the electronic device on the receiving side, and terminating power transmission after transmitting the electric power as much an amount as calculated. This will be described in more detail later.

The memory 130 may include volatile or nonvolatile memories. The memory 130 stores command or data related to at least one of the other components of the electronic device 101. In an embodiment, the memory 130 stores software or a program 140. The program 140 includes, for example, kernel 141, middleware 143, Application Programming Interface (API) 145, application program (application) 147, or the like. At least a part of the kernel 141, middleware 143, or API 145 is referred to as an Operating System (OS).

The kernel 141 controls or manages system resources (such as the bus 110, the processor 120, the memory 130 or the like) to be used to carry out an operation or function implemented by the other programming modules, such as the middleware 143, the API 145, or the application 147. Furthermore, the kernel 141 provides an interface for the middleware 143, the API 145, or the application program 147 to access respective components of the electronic device 101 to control or manage them.

The middleware 143 may act as intermediary such as for the API 145 or the application program 147 to communicate data with the kernel 141. In addition, the middleware 143 performs control operations (such as scheduling or load balancing) in response to a task request received from the application program 147 by way of such as placing a high priority on at least one application included in the application program 147 to use system resources (such as the bus 110, the processor 120, the memory or the like) of the electronic device 101.

The API 145 is an interface for the application 147 to control a function provided from the kernel 141 or the middleware 143, and includes at least one interface or function (such as an instruction) for such as file control, window control, image processing, text control, or the like. In various embodiments, the application 147 includes a Short Messaging System/Multimedia Messaging System (SMS/MMS) application, an email application, a calendar application, an alarm application, a charging management application (such as an application for monitoring power sharing state), or the like. The application 147 is an application involved in information exchange between the electronic device 101 and an external electronic device, such as 102, 104. The application involved in such information exchange includes for example a notification relay application for relaying particular information to the external electronic device 104 or a device management application for managing the external electronic device 104.

The application 147 includes an application designated depending on an attribute of the electronic device 104, such as on a type of the electronic device 104. The application 147 also includes at least one of an application designated for the electronic device 101, or an application received from the external electronic device 102, 104 or a server 106.

For example, in case of the charging management application, the electronic device 101 runs the charging management application to discover an external electronic device 102 to share electric power with. If there is a plurality of devices discovered for the electronic device 101 to distribute electric power as charging targets, the user selects one of them. In this regard, an electronic device, such as the external electronic device 102, receives a request for power-related information from the electronic device 101, and in response, provides its power-related information.

In an embodiment, the external electronic device 102 provides information about its identification, and power-related information, such as consumption power per application, a remaining amount of battery, temperature, charging efficiency at the current position, or the like. In response, if the user of the electronic device 101 inputs an amount of electric power to be transmitted to the external electronic device 102, the electronic device 101 calculates a running time per application available for the external electronic device 102 from the input amount of electric power based on the power-related information, and displays the running time.

For example, the electronic device 101 calculates an amount of electric power (or consumption power) required to run at least one application in the external electronic device 102 based on the power-related information. For example, if the user of the electronic device 101 wants to share 50% of electric power held by the electronic device 101 with the external electronic device 102, the electronic device 101 calculates for example an available running time for each of at least one application in the external electronic device 102 based on the 50% of the electric power of the electronic device 101. The electronic device 101 allows the user to easily determine an amount of electric power to be shared by calculating running time and corresponding consumption power of an application in the external electronic device 102 and displaying the consumption power information per application for the user.

In an embodiment, in order for the user to easily determine an amount of electric power 164 to be transmitted, the electronic device 101 displays an available running time per application in the external electronic device 102 on the display 160 based on the input amount of electric power 164. The electronic device 101 then transmits the amount of electric power 164 determined by the user to the external electronic power 102, and when the transmission of the electric power 164 as much as determined is completed, the electronic device 101 terminates power 164 transmission.

The I/O interface 150 serves to deliver commands or data input from for example the user or an external device to other components 110 to 140, 160, and 170 of the electronic device 101. The I/O interface 150 also outputs commands or data received from the other component(s) 110 to 140, 160, and 170 of the electronic device 101 to the user or other electronic device(s).

The display 160 includes for example a Liquid Crystal Display (LCD), a Light Emitting Diode (LED) display, an organic LED (OLED) display, Micro-Electromechanical System (MEMS) display, or an electronic paper display. The display 160 displays various contents, such as text, images, video, icons, symbols, or the like, for the user. The display 160 includes a touch screen, which detects touches, gestures, proximity or hovering inputs by way of an electronic pen or a body part of the user.

In another embodiment, the display 160 displays screens resulting from running of the charging management application under control of the controller. The display 160 also displays a screen to guide the user to select a charging target, and when the charging target is selected, provide functions, such as displaying a charging progress state of the selected charging target. For example, once charging begins by running the charging management application, the charging progress state is displayed on the display 160.

The display 160 is implemented with the touch screen. In an embodiment, while electric power is being shared, if the external electronic device 102 is placed in a wrong position for charging, guidance information, such as information indicating to move to a right position for charging is output on the display 160. The guidance information is provided to the user as an image displayed on the display 160, vibration, sound, or the like.

The communication interface 170 establishes communication between the electronic device 101 and an external electronic device, such as the first external electronic device 102, the second external electronic device 104 or the server 106. For example, the communication interface 170 is connected to a network 162 through wired or wireless communication and communicates with the external electronic device 104 or the server 106.

Wireless communication uses at least one of Long Term Evolution (LTE), LTE-Advanced (LTE-A), Code Divisional Multiplexing Access (CDMA), Wireless CDMA (WCDMA), Universal Mobile Telecommunications System (UMTS), WiBro, Global System for Mobile communication (GSM), or the like. The wired communication includes at least one of Universal Serial Bus (USB), High Definition Multimedia Interface (HDMI), Recommended Standard (RS) 232, Plain Old Telephone Service (POTS), or the like. The network 162 includes a telecommunication network, such as at least one of computer networks (such as Local Area Network (LAN) or Wide Area Networks (WAN)), Internet, and telephone network.

In an embodiment, the electronic device 101 uses a short-range communication scheme, such as Wi-Fi, Bluetooth, or the like, in scanning to share electric power with the nearby electronic device 102. The electronic device 101 discovers at least one nearby electronic device in a short-range wireless communication scheme and wirelessly shares electric power with the at least one nearby electronic device. For this, the electronic device 101 and the external electronic device 102 further includes a charging module for wireless power transmission, that is able to support wireless power transmission, reception, or both of them based on the wireless charging scheme.

The charging module serves to share electric power with the external electronic device 102, and operates based on the wireless charging scheme for power transmission to the external electronic device 102. The wireless charging scheme is largely divided into an electromagnetic induction scheme using coils, a resonance scheme using resonance, a Radio Frequency (RF)/micro wave radiation scheme that converts electric energy to micro waves, a resonance coupling scheme, or the like. The charging module operates based on one of the schemes. Each of the first and second external electronic devices 102 and 104 may or may not be of the same type as that of the electronic device 101. In an embodiment, the server 106 includes a group of one or more of servers.

In various embodiments, all or a part of operations executed in the electronic device 101 are also executed in one or more of other electronic devices, such as 102, 104, or in the server 106. In an embodiment, when the electronic device 101 needs to perform a function or service automatically or on request, the electronic device 101 requests another device, such as the electronic device 102 or 104, or the server 106 to perform at least a part of the function or service, instead of or in addition to performing the function or the service by itself. The other electronic device such as 102 or 104, or the server 106 performs the requested function or service, and sends the results to the electronic device 101. The electronic device 101 provides the function or the service by processing the received results intact or additionally. For this, for example, cloud computing, distributed computing, or client-server computing can be used.

Figure 2:
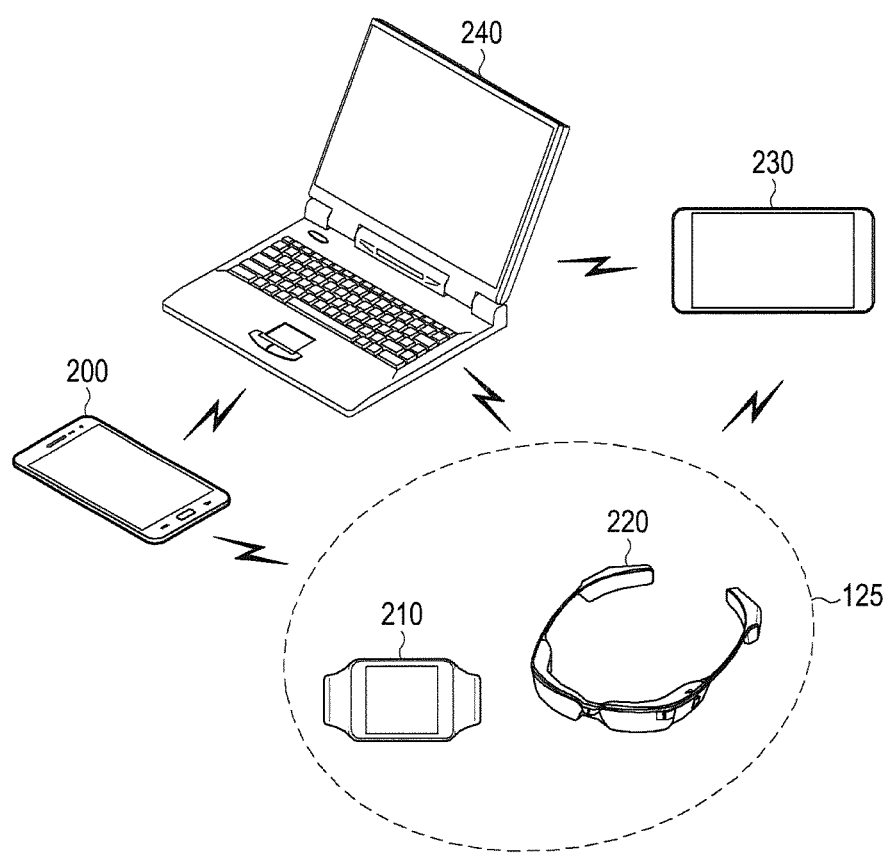
FIG. 2 shows a diagram for explaining an example method for sharing electric power among electronic devices according to this disclosure.

FIG. 2 shows a diagram for explaining an example method for sharing electric power among electronic devices according to this disclosure. Referring to FIG. 2, electronic devices enabled to share electric power includes a smartphone 200, a wrist wearable electronic device 210, a glasses-type electronic device 220, a tablet PC 230, a notebook 240, or the like. In various embodiments, when at least one of the electronic devices 200, 210, 220, 230, 240 is under a situation to be supplied with electric power while running an application, an electronic device that has enough electric power supplies the electric power to the electronic device in need of power. In this case, an electronic device on the power receiving side is within a range of wireless transmission of an electronic device on the power transmitting side, and is supplied with electric power from the electronic device on the power transmitting side.

Portability of electronic devices is improved by sharing electric power among electronic devices without carrying accessories, such as separate chargers, extra batteries, charging cables, or the like. Moreover, the embodiments also improve user convenience because electric power is shared irrespective of battery types of the electronic device, such as detachable types, integrated types, or the like, and charging is enabled anytime, anywhere as long as there is an electronic device that shares electric power. Furthermore, for the wrist wearable electronic device 210 and the glasses-type electronic device 220, which are of a type 125 of electronic device having a non-detachable battery, they are supplied with electric power from another electronic device, such as smartphone 200, and thus considered more effective in design, waterproofing, and durability. Moreover, since an electronic device like the smartphone 200 with limited electric power terminates power transmission after transmitting as much electric power as required to another electronic device in need of charging, the limited electric power is efficiently shared.

Figure 3:
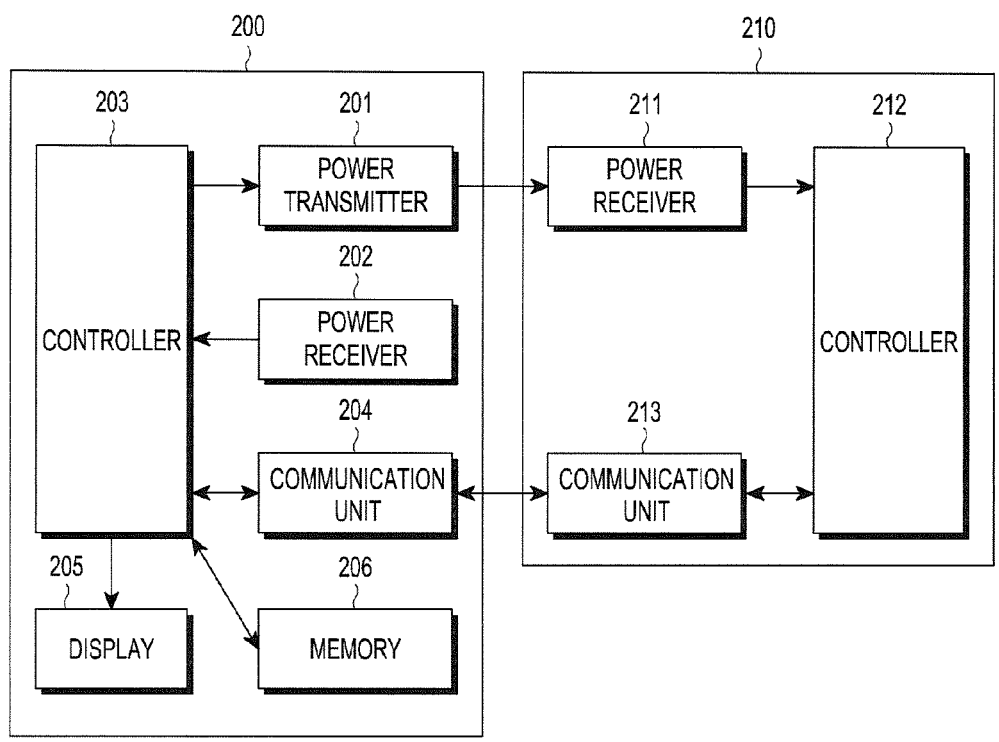
FIG. 3 is a block diagram of example electronic devices on power transmitting and receiving sides according to this disclosure.

FIG. 3 is a block diagram of example electronic devices on power transmitting and receiving sides according to this disclosure. Although it is illustrated in FIG. 3 that an electronic device on the power transmitting side is the smartphone 200 of FIG. 2 and an electronic device on the power receiving side is the wrist wearable electronic device 210 of FIG. 2, embodiments of the present disclosure are not limited thereto. Referring to FIG. 3, the electronic device 200 on the power transmitting side includes a power transmitter 201, a power receiver 202, a controller 203, a communication unit 204, a display 205, and memory 206. The electronic device 210 on the power receiving side includes a power receiver 211, a controller 212, and a communication unit 213. Although it is illustrated in FIG. 3 that the electronic device 210 on the power receiving side is only equipped with power receiving capability, the electronic device 210 is implemented to further include power transmitting capability to share electric power with other electronic device(s). In other words, the electronic device 200 on the power transmitting side and the electronic device 210 on the power receiving side each have a circuit for wireless power transmission to transmit or receive electric power wirelessly, or support both transmission and reception.

The power transmitter 201 is configured to wirelessly transmit electric power to the electronic device 210 on the power receiving side, which is detected within a wireless charging range. The power transmitter 201 supplies electric power wirelessly to the power receiver 211. In this regard, the wireless power is delivered by a magnetic-field inductive coupling method, a resonant coupling method, or a combination of them. The power transmitter 201 includes a component required to transmit wireless power according to the wireless power transmission method. For example, the power transmitter 201 includes a coil to transmit magnetic-field typed or electromagnetic-field typed wireless power which has a vibrating property. In an embodiment, the power transmitter 201 supplies power in an Alternate Current (AC) waveform, or converts power in a Direct Current (DC) form into an AC waveform for supply by means of an inverter. The power transmitter 201 is implemented in a form of the battery therein, or is implemented in a form of a power reception interface to receive power from the outside and supply the received power to other components. People having ordinary skill in the art will readily understand that the power transmitter 201 is not limited to what was described above but can be implemented with any means that may provide AC power.

The power receiver 211 of the electronic device 210 on the power receiving side is configured to receive the wireless power from the power transmitter 201. The controller 203 controls general operations of the electronic device 200 on the power transmitting side. The controller 203 controls the general operations of the electronic device 200 on the power transmitting side by using a control algorithm, program, or application read from the memory 206. The controller 203 is implemented in the form of a CPU, a microprocessor, or a mini-computer.

Upon reception of a request from the user for sharing electric power, the controller 203 displays transmittable power on the display 205 based on the current battery state. The controller 203 also displays a power state of the electronic device 210 on the power receiving side on the display 205 based on a message received from the electronic device 210 through the communication unit 204. In other words, the controller 203 displays the power state of the electronic device 210 on the power receiving side based on power-related information obtained from the communication unit 213 of the electronic device 210.

In an embodiment, as an amount of electric power to be charged is input by the user, the controller 203 calculates available running time per application of the electronic device 210 on the power receiving side based on the input amount of electric power and display the available running time per application on the display 205. As transmission of the electric power starts, the controller 203 also displays an estimate of the time needed to complete transmission of the set amount of electric power to the electronic device 210 on the power receiving side, transmission progress state, or the like, on the display 205. The controller 203 also calculates and displays a change in charging efficiency due to the movement of the position of the electronic device 210 on the power receiving side, thereby guiding the user to compensate for the current charging position of the electronic device 210.

The communication unit 204 performs communication with the electronic device 210 in a short-range communication scheme. The communication unit 204 receives power-related information from the wireless power receiver 210 on the power receiving side. The power-related information includes at least a piece of information about identification of the electronic device 210 on the power receiving side, battery state of the electronic device 210, consumption power per application based on the running time, temperature, and charging efficiency at the current position. The controller 203 of the electronic device 200 on the power transmitting side is aware of information required to share electric power with the electronic device 210 on the power receiving side through the communication unit 204, such as information about a remaining amount of battery of the electronic device 210, information about consumption power for running an application of the electronic device 210, information about charging efficiency while the electronic device 210 is charged at the current position.

The communication unit 204 transmits a charging function control signal to control a charging function of the electronic device 210 on the power receiving side. The charge function control signal is a control signal to enable or disable the charging function by controlling the power receiver 211 of the electronic device 210. When the transmission as much electric power as determined by the user is completed, the controller 203 terminates power transmission operation of the power transmitter 201 while sending a control signal to disable the charging function to the communication unit 213 of the electronic device 210 on the power receiving side through the communication unit 204. The communication unit 204 receives signals not only from the electronic device 210 but also from other electronic device(s) on the power receiving side.

According to an embodiment, a first electronic device, for sharing electric power with a second electronic device, includes a communication interface configured to obtain power-related information of the second electronic device if the first electronic device is connected to the second electronic device; a processor configured to: determine a power state of the second electronic device based on the power-related information of the second electronic device, and determine an amount of electric power to be transmitted to the second electronic device; and a power transmitter configured to transmit the electric power to the second electronic device.

Figure 4:
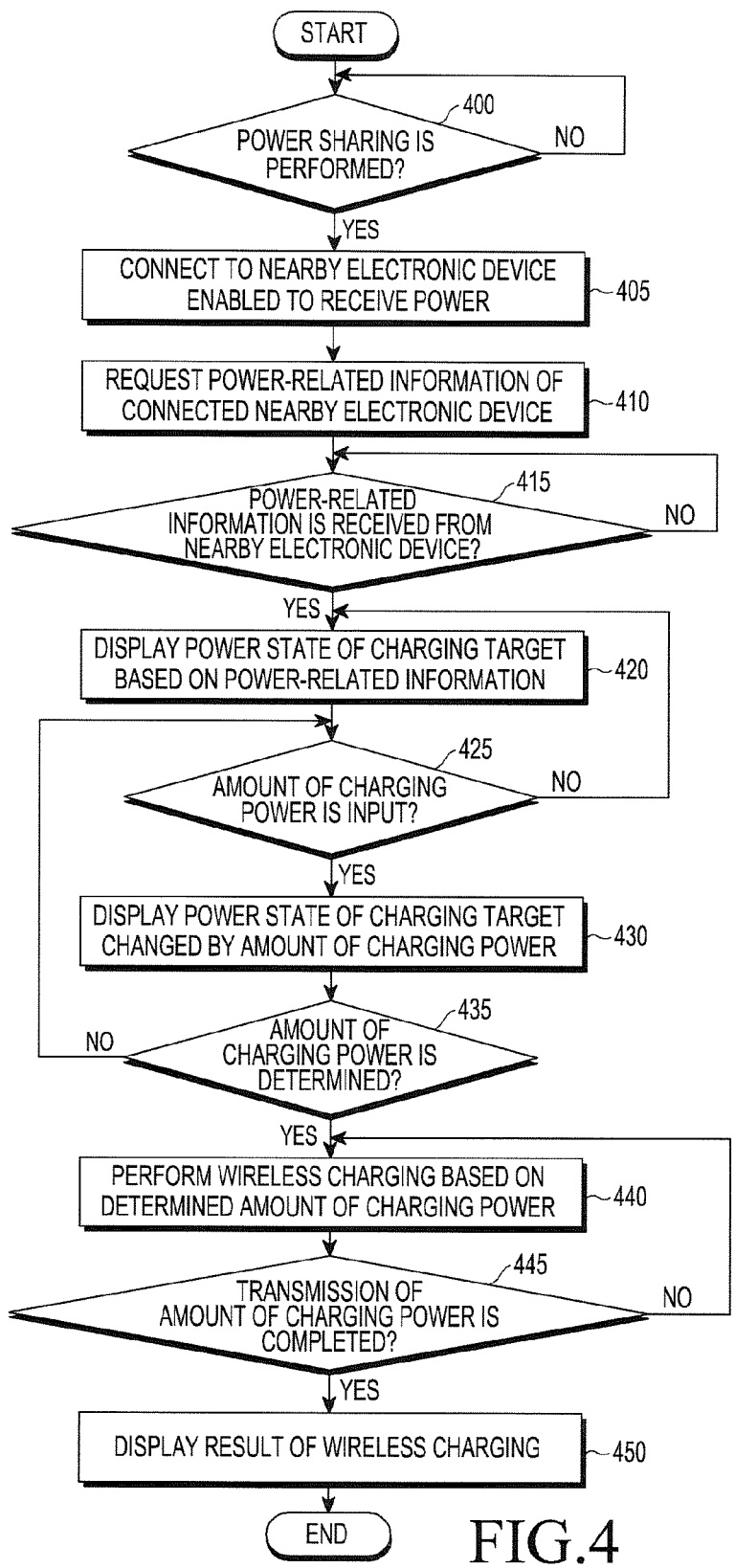
FIG. 4 is a flowchart illustrating an example operation of an electronic device on the power transmitting side to share electric power according to this disclosure.

FIG. 4 is a flowchart illustrating an example operation of an electronic device on the power transmitting side to share electric power according to this disclosure. Referring to FIG. 4, the electronic device 200 on the power transmitting side begins to share electric power in operation 400, and performs connection with a nearby electronic device that is able to receive the electric power from the electronic device 200 in operation 405. Since a plurality of nearby electronic devices is searched for by a short-range wireless communication scheme, the electronic device 200 allows the user to select one of the electronic devices as a charging target by displaying the electronic devices searched for on the screen. The nearby electronic devices searched for each have a capability to share electric power with the electronic device 200 using a power receiver for receiving the electric power from the electronic device 200. The electronic device 200 shares the electric power by transmitting the electric power to a nearby electronic device in need of charging by using various wireless charging schemes, such as magnetic inductance, magnetic resonance, or the like.

According to an embodiment, a method, for sharing, at a first electronic device, wireless power with a second electronic device, includes performing connection with the second electronic device; obtaining power-related information of the second electronic device; determining a power state of the second electronic device based on the power-related information of the second electronic device; determining an amount of electric power to be transmitted to the second electronic device based on the power state of the second electronic device; and transmitting the electric power of the determined amount to the second electronic device.

Figure 5:
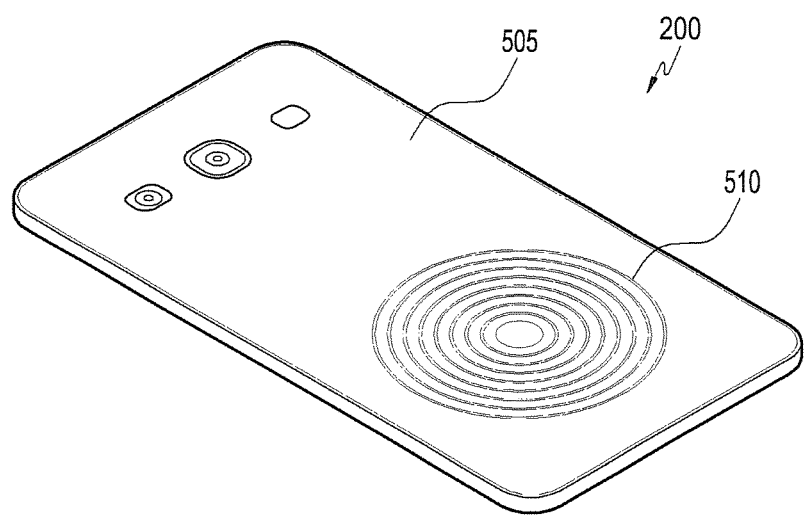
FIG. 5 shows example coil arrangement in an electronic device on the power transmitting side according to this disclosure.
Figure 6:
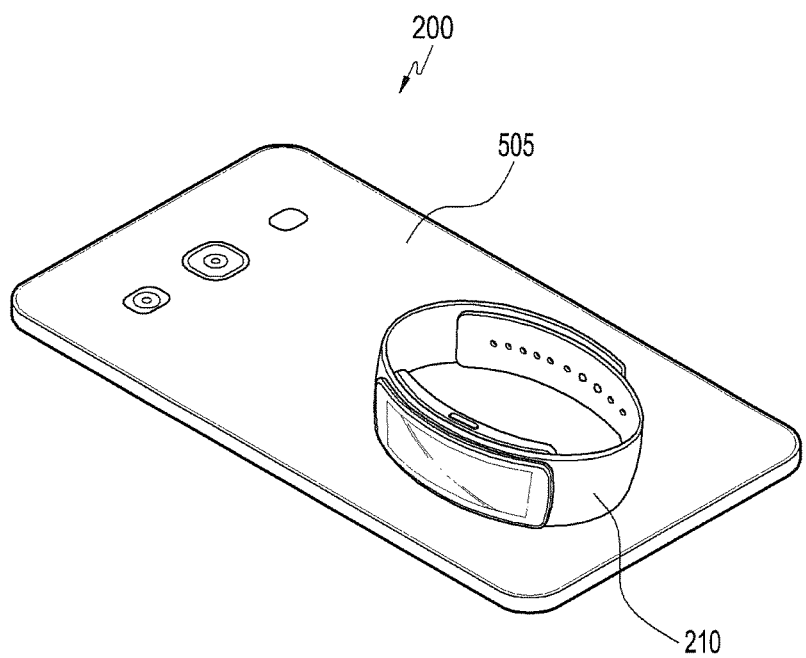
FIG. 6 is a perspective view of an example electronic device on the power receiving side that lies on an electronic device on the power transmitting side according to this disclosure.

Among the various wireless charging schemes, the magnetic induction scheme with a coil is used for wireless charging in the electronic device in FIG. 5. FIG. 5 shows an example coil arrangement in an electronic device on the power transmitting side according to this disclosure. A TX coil 510 is mounted on the rear face 505 of the electronic device 200 for transmitting electric power to be applied to a charging target. In the case of the magnetic induction scheme with the coil, as shown in FIG. 6, the charging target, the electronic device 210 on the power receiving side is placed on a location where the coil of the rear face 505 of the electronic device 200 is mounted. FIG. 6 is a perspective view of an example electronic device on the power receiving side that lies on an electronic device on the power transmitting side according to this disclosure.

When the electronic device 210 on the receiving side is put on the location where the coil is, the electronic device 200 on the transmitting side recognizes that the electronic device 210 is located on the electronic device 200 by detecting a change in current flowing in the coil. The electronic device 200 is connected to the detected electronic device 210 on the power receiving side via a short-range wireless communication.

If one of the nearby electronic devices is selected and connected thereto, the electronic device 200 sends a request for power-related information of the electronic device 210 to the electronic device 210 to obtain information required to share the electric power, in operation 410. In operation 415, the electronic device 200 determines whether the power-related information has been received from the electronic device 210 in return for the request. If the power-related information has been received, the electronic device 200 displays the power state of the charging target based on the power-related information, in operation 420. The power state of the charging target, which is displayed on the screen, serves to provide information helping the user to determine an amount of electric power to be shared.

Subsequently, the electronic device 200 determines whether an amount of charging power has been inputted by the user, in operation 425. If the amount of charging power has been inputted, the electronic device 200 displays the power state of the charging target changed by the input amount of charging power, in operation 430. If the amount of charging power is not determined yet in operation 435, the process goes back to operation 425, and the electronic device 200 recalculates the power state of the charging target based on an input amount of charging power and displays the changed power state. At this time, the electronic device 200 displays the power state of the charging target which corresponds to the amount of charging power input on the screen, such as an amount of power to be transmitted, in order for the user to figure out how much electric power is required to perform a particular function in the charging target.

If an amount of charging power is newly input, the electronic device 200 displays the power state of the charging target, which is changed by the newly input amount of charging power, in operation 430. As such, as an amount of power to be charged for the charging target is input from the user, the electronic device 200 to distribute the power recalculates the power state of the charging target and displays the result on the screen. Accordingly, the user understands at a glance how much electric power is required to perform a desired function.

Figure 7:
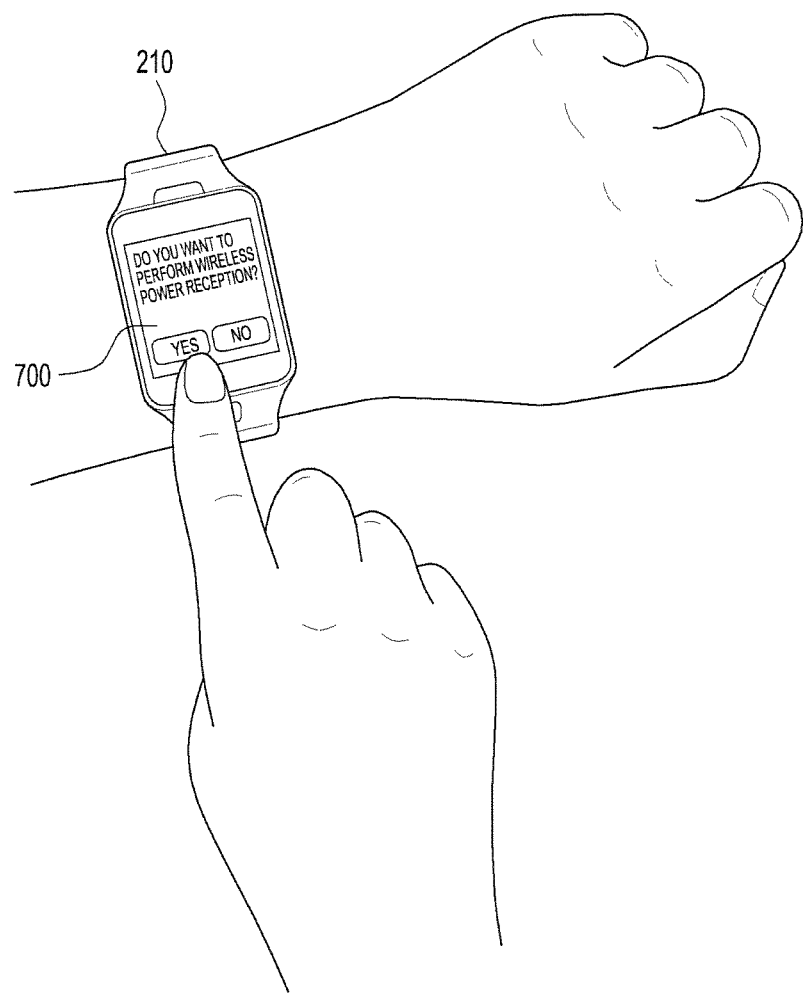
FIG. 7 shows an example message asking whether to perform wireless electric power reception, which is output on the screen of an electronic device on the power receiving side, according to this disclosure.

If an amount of charging power is determined in operation 435, such as inputting of an amount of charging power is completed, the electronic device 200 starts transmitting as much electric power as the input amount of charging power. Before transmission of the electric power is started, the electronic device 210 on the power receiving side is prepared for receiving the electric power. In an embodiment, as shown in FIG. 7, the electronic device 210 on the power receiving side outputs a message asking whether to perform wireless electric power reception on the screen 700 of the electronic device 210. FIG. 7 shows a message asking whether to perform wireless electric power reception, which is output on the screen of the electronic device 210 on the power receiving side. In FIG. 7, when the electronic device 210 on the receiving side is ready to receive the wireless electric power, the user presses a button to perform wireless power reception, and accordingly, the electronic device 200 begins transmitting as much electric power as the determined amount of charging power by receiving an acceptance message from the electronic device 210.

Although power transmission is triggered by the user pressing the button to perform wireless power reception in the electronic device 210 on the power receiving side, as shown in FIG. 7, it is implemented to be triggered by the electronic device 200 on the power transmitting side sending a control signal to enable the power reception function of the electronic device 210. Accordingly, the electronic device 200 performs wireless charging based on the determined amount of charging power, in operation 440. The wireless charging scheme is largely divided into an electromagnetic induction scheme using a coil, a resonance scheme using resonance, a Radio Frequency (RF)/micro wave radiation scheme that converts electric energy to micro waves, a resonance coupling scheme, or the like, and the electronic device 200 operates based on one of the schemes.

In operation 445, the electronic device 200 determines whether the transmission of the amount of charging power has been completed, and if the transmission has been completed, in operation 450, the electronic device 200 terminates power transmission and displays the results of wireless charging. Although in the embodiment of FIG. 4, power transmission is terminated after a target amount of charging power has been transmitted, power transmission is terminated even when a predetermined termination condition is met. For example, even if an event occurs, such as deviation from a chargeable range of the electronic device 210 on the power receiving side, termination of charging because the electronic device 210 is overheated, or the like, power transmission is terminated.

Assuming a case of determining and requesting an amount of electric power required by the electronic device 210 on the power receiving side rather than determining an amount of electric power to be transmitted by the electronic device 200, even if charging the electronic device 210 with as much electric power as required is completed, the electronic device 200 might keep transmitting electric power, although the electric power is at a low level, while connected to the electronic device 210. However, the electronic device 200 terminates power transmission after transmission of electric power as much as the determined target amount is completed, and thus the limited electric power of the electronic device 200 is efficiently managed.

In addition to terminating power transmission when a target amount is reached, there is a method for increasing charging efficiency as a method to efficiently transmit the limited electric power. The method for increasing charging efficiency takes into account a charging position because charging efficiency is influenced by the charging position, which will be discussed herein.

FIGS. 8A, 8B, 9A, and 9B show example charging efficiencies that vary by positions where an electronic device on the power receiving side lies on an electronic device on the power transmitting side according to this disclosure. FIG. 8A shows an occasion where the electronic device 210, a charging target, lies beyond a location where a coil 810 is arranged on a front face 800 of the electronic device 200. In this case that the electronic device 210 lies beyond the coil arrangement location. As shown in FIG. 8B, charging efficiency information 820, such as information indicating that charging efficiency is low at the current position is displayed on the screen.

On the other hand, if the charging target, the electronic device 210 lies on a location where the coil 810 is arranged on the front face 800 of the electronic device 200, as shown in FIG. 9A, charging efficiency information 830, such as information indicating that charging efficiency has become better at the current position is displayed on the screen, as shown in FIG. 9B. To display the charging efficiency, the electronic device 200 requests information about a state of the electronic device 210 from the electronic device 210 to progress wireless charging, and in return, receive the state information. The state information includes battery voltage, consumption current for running an application, charging efficiency during charging at the current position, or the like.

FIGS. 10A, 10B, and 10C show example screens accompanied by searching operations for a charging target according to this disclosure. Referring to FIG. 10A, when a charging management application runs in an electronic device, such as the electronic device 200, the electronic device searches for another electronic device to share electric power with. In this regard, the electronic device searches for nearby electronic devices able to receive electric power as charging targets based on a short-range wireless communication scheme, and may display information about at least one electronic device searched for as a charging target as shown in FIG. 10B. Accordingly, respective objects 1010, 1020, 1030 corresponding to the at least one electronic device searched for is displayed on the screen of FIG. 10B, which is represented by various visual objects, such as icons, photos, text, images, or the like, of the at least one electronic device.

If a plurality of charging targets are searched for, the user can select one of them, and once a single charging target is selected, a message 1040 asking whether to start charging is displayed as shown in FIG. 10C. Since the electric power of the electronic device is limited and excessive power consumption makes it difficult to secure its operating time, it calculates an optimum amount of electric power required based on state information of the target electronic device for charging, transmits as much electric power as calculated, and then terminates power transmission. For this, the electronic device on the power transmitting side obtains the state information of the electronic device on the power receiving side.

Figure 11:
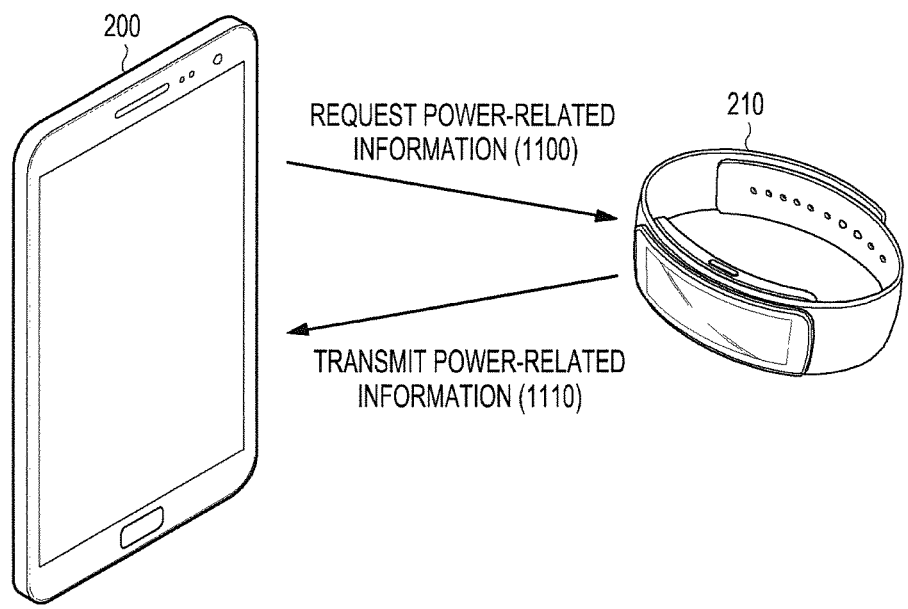
FIG. 11 shows a diagram for explaining an example method of an electronic device on the power transmitting side to receive power-related information from an electronic device on the power receiving side according to this disclosure.

FIG. 11 shows a diagram for explaining an example method for an electronic device on the power transmitting side to receive power-related information from an electronic device on the power receiving side according to this disclosure. Referring to FIG. 11, the electronic device 200 to share electric power sends a charging target, the electronic device 210 a request for power-related information (1100) and in return, receives the power-related information from the electronic device 210 (1110). The power-related information includes at least a piece of information about identification of the electronic device 210, battery state of the electronic device 210, consumption power per application based on running time of the electronic device 210, and charging efficiency.

Figure 12:
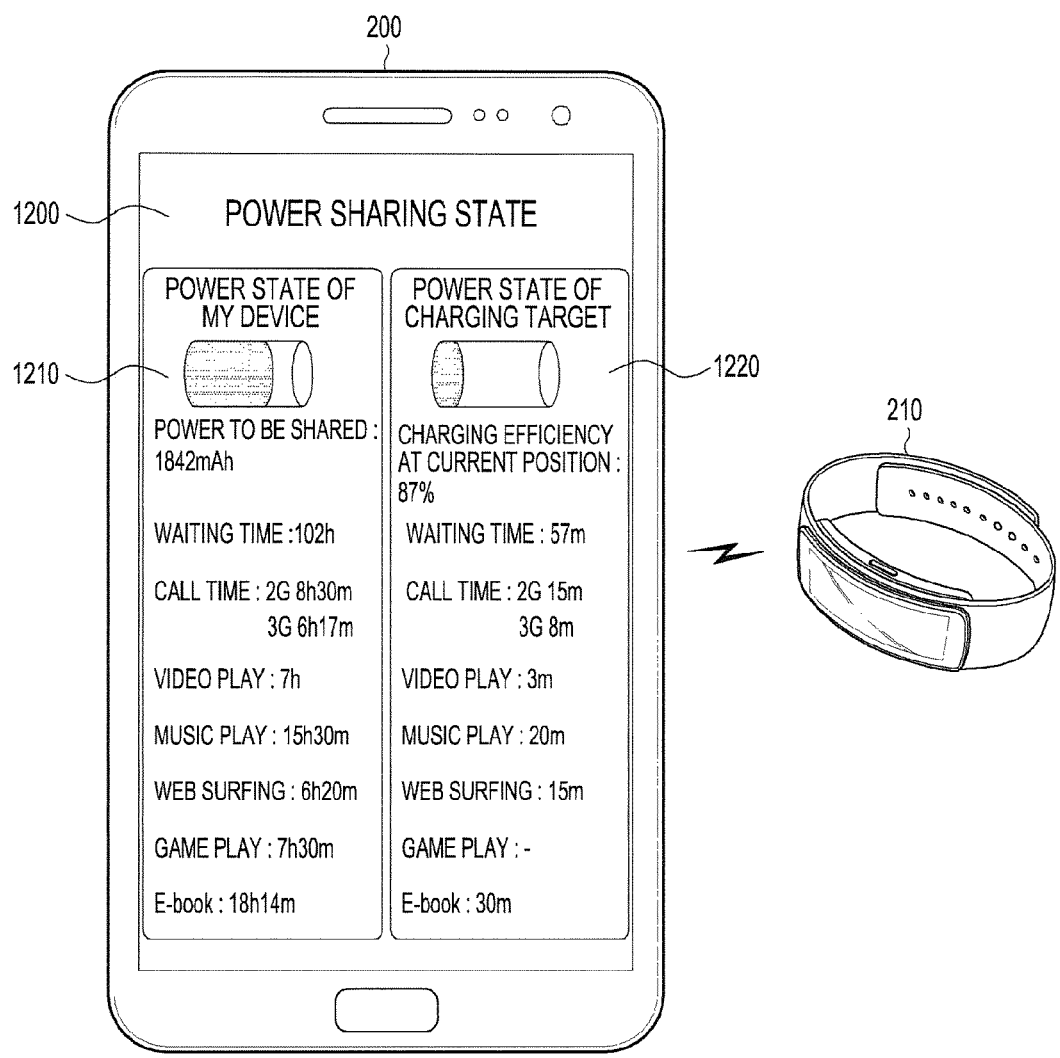
FIG. 12 shows a screen displaying an example power sharing state according to this disclosure.

FIG. 12 shows a screen displaying an example power sharing state according to this disclosure. Referring to FIG. 12, the electronic device 200 receives power-related information from the charging target, such as the electronic device 210, and displays a screen 1200 that shows a power sharing state based on the power-related information. A power state 1210 of the electronic device 200 on the power transmitting side and a power state 1220 of the electronic device 210 on the power receiving side is displayed in the screen 1200. Information helping the user to select an amount of electric power is displayed in the power sharing screen 1200. For example, as shown in FIG. 12, sharable electric power from the electronic device 200 on the power transmitting side, and available running time of at least one application in the electronic device 200 based on the sharable electric power is displayed. Furthermore, remaining power of the electronic device 210 on the power receiving side, charging efficiency at the current position, and available running time of at least one application in the electronic device 210 based on the remaining power is displayed. While the power sharing screen 1200 is displayed, if a change, such as in the charging position of the electronic device 210 is made, charging efficiency at the changed position is displayed. In this regard, the electronic device 200 receives the charging efficiency at the changed position from the electronic device 210, or determines a change in charging efficiency by detecting a change in current flowing in the coil of the electronic device 200. Displaying such a change in charging efficiency guides the user to change the charging position.

In various embodiments, as the power state screen of the electronic device 210 on the power receiving side configured based on the power-related information is displayed, the user determines an amount of transmit electric power by referring to the power state screen. The user determines the amount of transmit power by setting a running time per application of the electronic device 210 on the power receiving side, or by inputting the amount of transmit power by himself or herself, or by setting a transmission progress time and transmission strength.

Figures 13A, 13B:
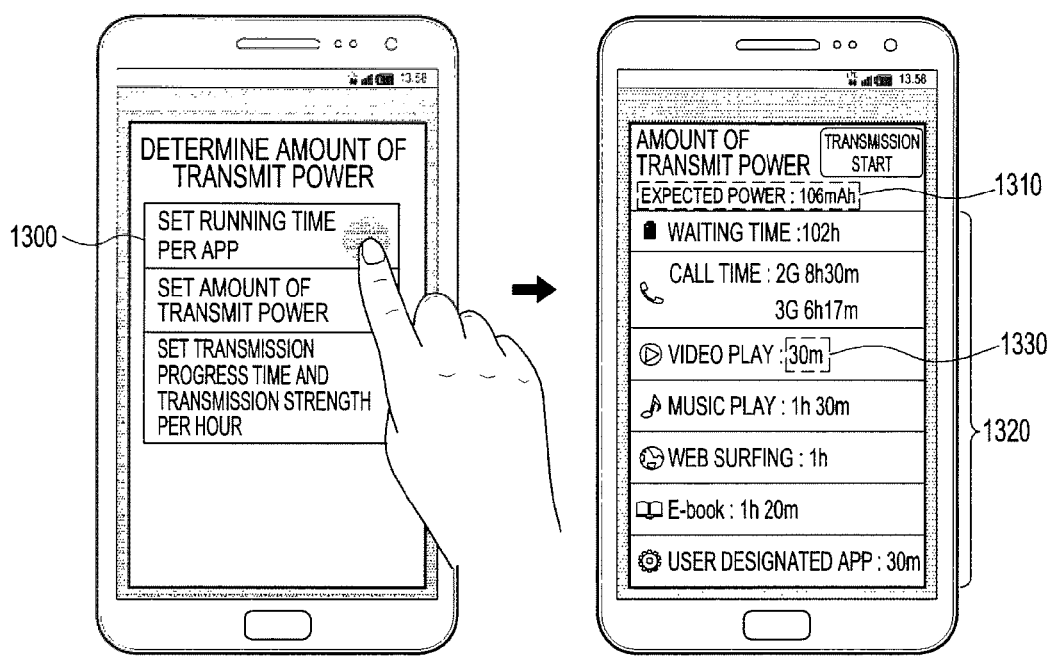
FIGS. 13A and 13B show example screens for setting a running time per application according to this disclosure.

FIGS. 13A and 13B show example screens for setting running time per application according to this disclosure. Referring to FIG. 13A, items for determining an amount of transmit power are shown, such as items to set running time per application, set an amount of transmit power, transmission progress time and transmission strength per hour, and among the items, the item to set running time per application 1300 is selected.

Once the item to set running time per application 1300 is selected, as shown in FIG. 13B, necessary expected power 1310 is displayed based on at least one of information about consumption power based on the running time per application and power efficiency at the current position. The necessary expected power 1310 is an amount of electric power required to execute at least one of application items 1320. As a numerical value such as 1330 for one of the application items 1320 is modified, values for the rest of the application items are changed and displayed in response to the modified numerical value 1330. For example, if an available running time of a video application is modified from half an hour to an hour (see, 1330), the necessary expected power for the modified available running time of the video application is calculated and displayed. The user adds or deletes at least one application item, and modifies an available running time of the at least one application item. Accordingly, the necessary expected power is recalculated and displayed. If the user wants to determine the necessary expected power to be an amount of transmit power and perform wireless charging, the user selects a start transmission button.

Figures 14A, 14B:
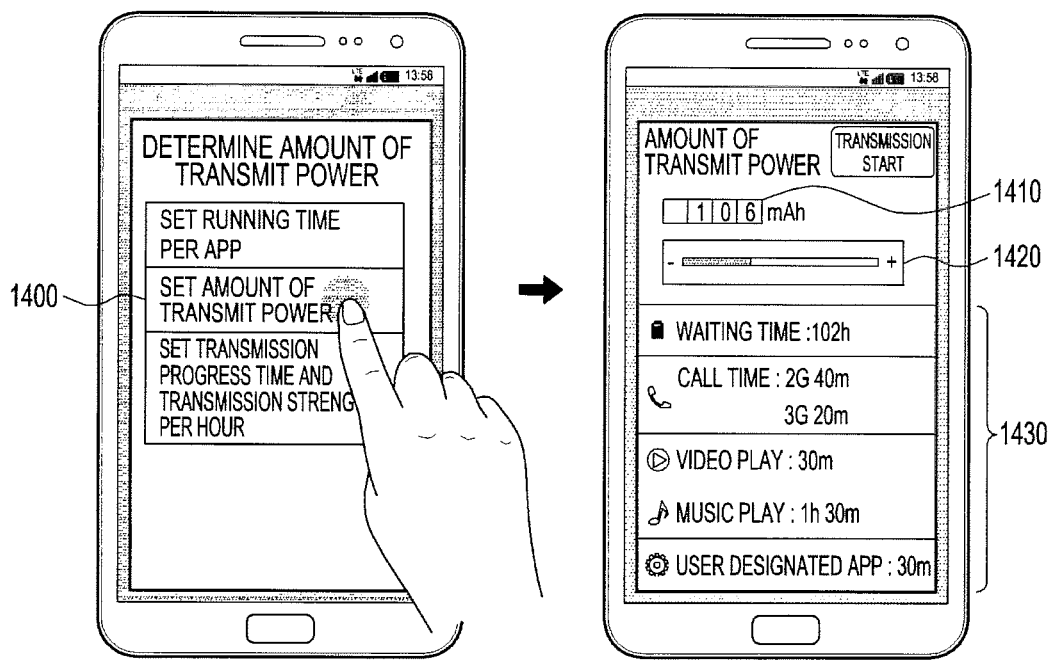
FIGS. 14A and 14B show example screens for setting an amount of transmit power according to this disclosure.

FIGS. 14A and 14B show an example screen for setting an amount of transmit power according to this disclosure. FIG. 14A shows an occasion where an item 1400 to set an amount of transmit power among items to determine the amount of transmit power is selected. Once the item 1400 to set an amount of transmit power is selected, as shown in FIG. 14B, a screen for the user to directly input an amount of transmit power is displayed. Referring to FIG. 14B, the user modifies a value 1410 of the amount of transmit power by directly inputting a numerical value or by using a control bar 1420. Based on the value 1410 of the amount of transmit power directly input by the user, an available running time of at least one of application items 1430 of an electronic device on the power receiving side, such as the electronic device 210 is calculated and displayed.

Figures 15A, 15B:
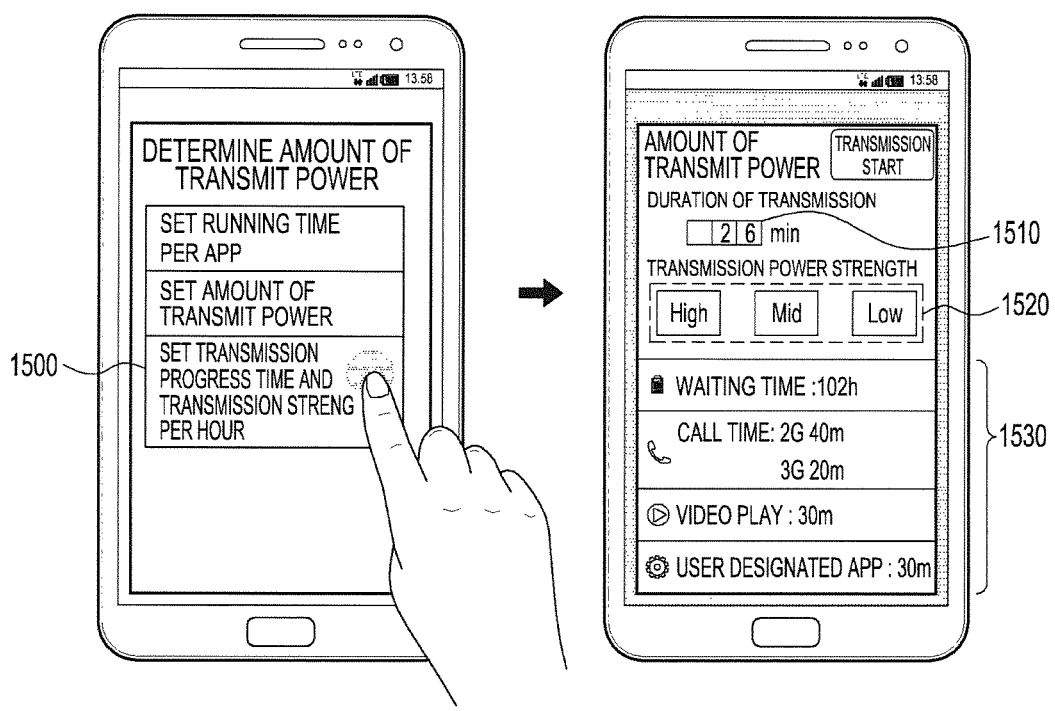
FIGS. 15A and 15B show example screens for setting transmission progress time and power strength per hour according to this disclosure.

FIGS. 15A and 15B show example screens for setting transmission progress time and power strength per hour according to this disclosure. FIG. 15A shows an occasion where an item 1500 to set transmission progress time and power strength per hour among items to determine an amount of transmit power is selected. Once the item 1500 to set transmission progress time and power strength per hour is selected, as shown in FIG. 15B, an item 1510 to input a duration of transmission and an item 1520 to input a transmit power strength is displayed. In response to inputs of the items 1510, 1520, an available running time of at least one of application items 1530 of the electronic device 210 on the power receiving side is calculated and displayed. As such, the user sets a power transmission time, and in response, the electronic device, such as the electronic device 210, performs power transmission for the set transmission time, changes an amount of transmit power per hour to achieve a goal within the power transmission time, and transmits the changed power.

Figure 16:
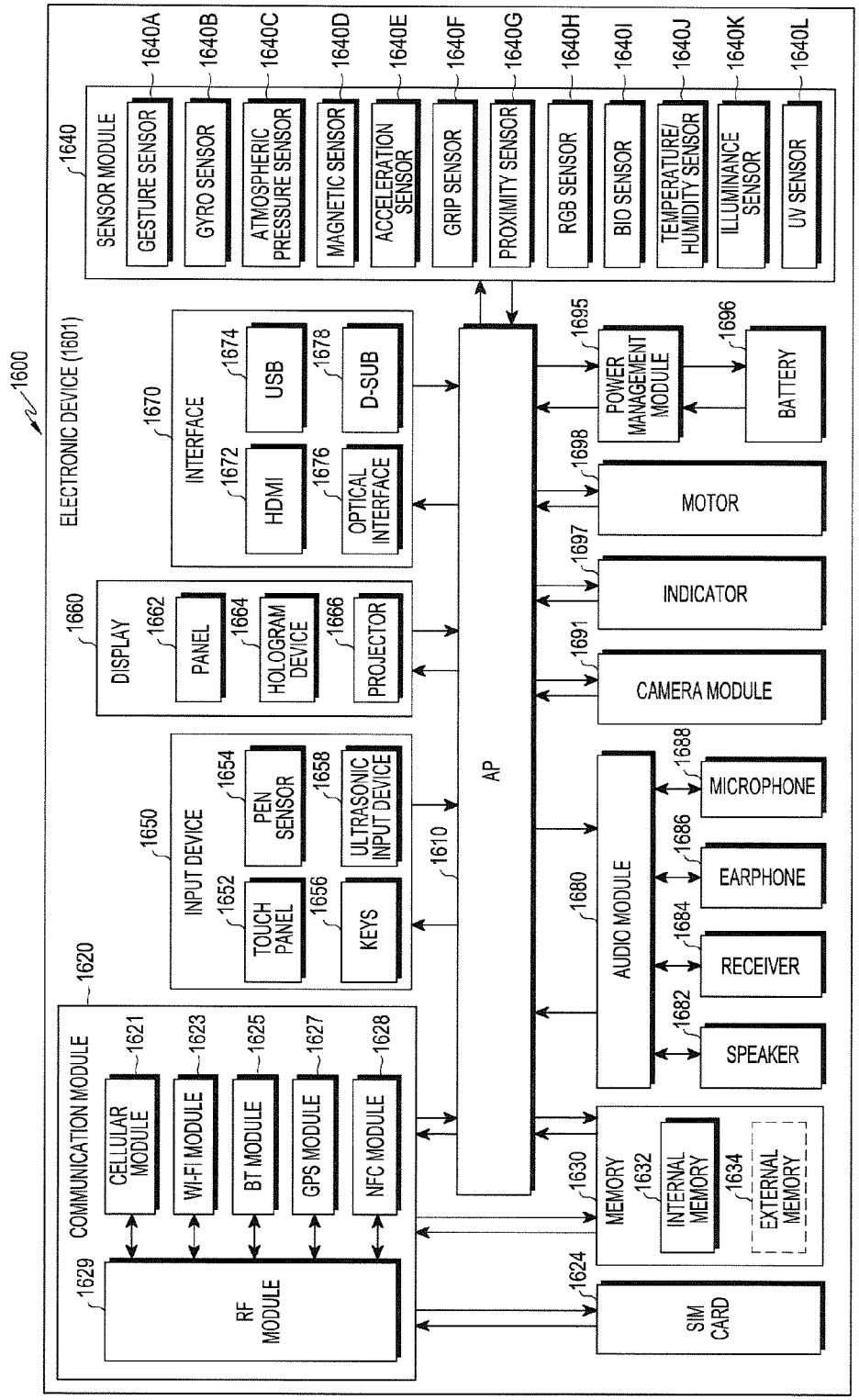
FIG. 16 is a block diagram of an example electronic device according to this disclosure.

FIG. 16 is a block diagram 1600 of an electronic device according to this disclosure. The electronic device 1601 includes a part or all of an electronic device such as electronic device 101 shown in FIG. 1. The electronic device 1601 includes one or more Application Processors (APs) 1610, a communication module 1620, a Subscriber Identification Module (SIM) card 1624, a memory 1630, a sensor module 1640, an input device 1650, a display 1660, an interface 1670, an audio module 1680, a camera module 1691, a power manager module 1695, a battery 1696, an indicator 1697, and a motor 1698.

The AP 1610 controls hardware and software components connected to the AP 1610 by running for example an operating system or application programs, and performs data processing and operations. The AP 1610 is implemented in for example a System on Chip (SoC). In accordance with an embodiment, the AP 1610 further includes a Graphic Processing Unit (GPU) or an image signal processor. The AP 1610 also includes at least a part of the components shown in FIG. 16, such as a cellular module 1621. The AP 1610 processes a command or data received from at least one of the other components, such as a nonvolatile memory to be loaded onto a volatile memory, and stores various types of data in the nonvolatile memory.

The communication module 1620 is configured in the same or a similar way to the communication interface 170 of FIG. 1. The communication module 1620 includes the cellular module 1621, a Wi-Fi module 1623, a BT module 1625, a GPS module 1627, a Near Field Communication (NFC) module 1628, and a Radio Frequency (RF) module 1629. The cellular module 1621 provides for example a voice call, a video call, texting, or Internet services over a communication network. In an embodiment, the cellular module 1621 also identifies and authenticates the electronic device 1601 in the communication network in cooperation with the SIM card 1624. In accordance with an embodiment, the cellular module 1621 performs at least a part of functions that the AP 1110 provides. In an embodiment, the cellular module 1621 includes a Communication Processor (CP).

The Wi-Fi module 1623, the BT module 1625, the GPS module 1627, and the NFC module 1628 each include a processor for processing data sent or received through the corresponding module. In an embodiment, at least some (such as two or more) of the cellular module 1621, the Wi-Fi module 1623, the BT module 1625, the GPS module 1627, or the NFC module 1628 is integrated in a single IC or an IC package. The RF module 1629 transmits or receives communication signals, such as RF signals. The RF module 1629 includes for example a transceiver, a Power Amp Module (PAM), a frequency filter, a Low Noise Amplifier (LAN), or an antenna. In another embodiment, at least one of the cellular module 1621, the Wi-Fi module 1623, the BT module 1625, the GPS module 1627, or the NFC module 1628 transmits or receives RF signals through a separate RF module 1629.

The SIM card 1624 includes a card including a SIM or an embedded SIM, including unique identification information, such as an Integrated Circuit Card Identifier (ICCID) or an International Mobile Subscriber Identity (IMSI). The memory 1630 (corresponding to the memory 130) includes for example an internal memory 1632 or an external memory 1634. The internal memory 1632 includes for example at least one of a volatile memory, such as Dynamic Random Access Memory (DRAM), Static RAM (SRAM), Synchronous Dynamic RAM (SDRAM), or the like, or a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, Nor flash memory, or the like, a hard driver, or a Solid State Driver (SSD).

The external memory 1634 includes a flash drive, such as compact flash (CF), secure digital (SD), micro secure digital (Micro-SD), mini secure digital (Mini-SD), extreme digital (xD), memory stick, or the like. The external memory 1634 is operationally or physically connected to the electronic device 1601 through various interfaces. The sensor module 1640 measures a physical quantity or converts information measured or detected by monitoring the electronic device 1601 to an electric signal. The sensor module 1640 includes at least one of a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H such as an RGB (Red, Green, Blue) sensor, a bio sensor 1640I, a temperature/humidity sensor 1640J, an illumination sensor 1640K, or an Ultra Violet (UV) sensor 1640M. Additionally or alternatively, the sensor module 1640 includes an E-nose sensor, an electromyography (EMG) sensor, an electroencephalogram (EEG) sensor, an electrocardiogram (ECG) sensor, an infrared (IR) sensor, an iris sensor, a finger print sensor, or the like. The sensor module 1640 further includes a control circuit for controlling at least one or more of the sensors included in the sensor module 540. In some embodiments, the electronic device 1601 further includes a processor configured to control the sensor module 1640 as a part of or separate from the AP 1610, to control the sensor module 1640 while the AP 1610 is in sleep state.

The input device 1650 includes a touch panel 1652, a (digital) pen sensor 1654, a key 1656, or an ultrasonic input device 1658. The touch panel 1652 employs at least one of a capacitive, resistive, infrared, or ultrasonic method. The touch panel 1652 further includes a control circuit. The touch panel 1652 further includes a tactile layer for providing the user with haptic sensation. The (digital) pen sensor 1654 is a part of the touch panel 1652, or includes a separate sheet for recognition. The key 1656 includes a physical button, optical key or key pad. The ultrasonic input device 1658 uses an input tool that generates an ultrasonic signal and enables the electronic device 1601 to determine data by sensing the ultrasonic signal to the microphone 1688.

The display 1660 (corresponding to the display 160) includes a panel 1662, a hologram device 1664, or a projector 1666. The panel 1662 is configured in the same or a similar way to the display 160 of FIG. 1. The panel 1662 is implemented to be flexible, transparent, or wearable. The panel 1662 is also incorporated with the touch panel 1652 in a unit. The hologram device 1664 makes three dimensional (3D) images (holograms) in the air by using light interference. The projector 1666 displays an image by projecting light onto a screen. The screen is, for example, located inside or outside of the electronic device 1601. In accordance with an embodiment, the display 1660 further includes a control circuit to control the panel 1662, the hologram device 1664, or the projector 1666.

The interface 1670 may include a High Definition Multimedia Interface (HDMI) 1672, a USB 1674, an optical interface 1676, or a D-subminiature (D-sub) 1678. The interface 1670 is included in the communication interface 160 shown in FIG. 1. Additionally or alternatively, the interface 1670 includes a Mobile High-definition Link (MHL) interface, a secure digital (SD) card/multimedia card (MMC) interface, or IrDA standard interface. The audio module 1680 converts between sound and electric signals. At least a part of the audio module 1680 is included in the I/O interface 150 as shown in FIG. 1. The audio module 1680 processes sound information input or output through a speaker 1682, a receiver 1684, an earphone 1686, or a microphone 1688.

The camera module 1691 is a device for capturing still images and videos, and includes one or more image sensors (such as front and back sensors), a lens, an Image Signal Processor (ISP), or a flash such as an LED or xenon lamp. The power manager module 1695 manages power of the electronic device 1601. In an embodiment, a Power management Integrated Circuit (PMIC), a charger IC, or a battery or fuel gauge is included in the power manager module 1695. The PMIC has wired or wireless charging schemes. The wireless charging scheme includes a magnetic resonance scheme, a magnetic induction scheme, or an electromagnetic wave based scheme, and an additional circuit, such as a coil loop, a resonance circuit, a rectifier, or the like is added for wireless charging. The battery gauge measures an amount of remaining power of the battery 1696, a voltage, a current, or a temperature while the battery 1196 is being charged. The battery 1696 includes a rechargeable battery or a solar battery.

The indicator 1697 indicates a particular state of the electronic device 1601 or a part of the electronic device (such as the AP 1610), the particular state including a booting state, a message state, or charging state. The motor 1698 converts an electric signal to a mechanical vibration, and produces vibration or haptic effects. A processing unit for supporting mobile TV, such as a GPU is included in the electronic device 1601. The processing unit for supporting mobile TV processes media data conforming to a standard for Digital Multimedia Broadcasting (DMB), Digital Video Broadcasting (DVB), or media flow.

Each of the aforementioned components of the electronic device 1601 includes one or more parts, and a name of the part varies by a type of the electronic device 1601. The electronic device 1601 includes at least one of the aforementioned components, or omits some of them, or includes other additional component(s). Some of the components are combined into an entity, but the entity performs the same functions as the components do.

Figure 17:
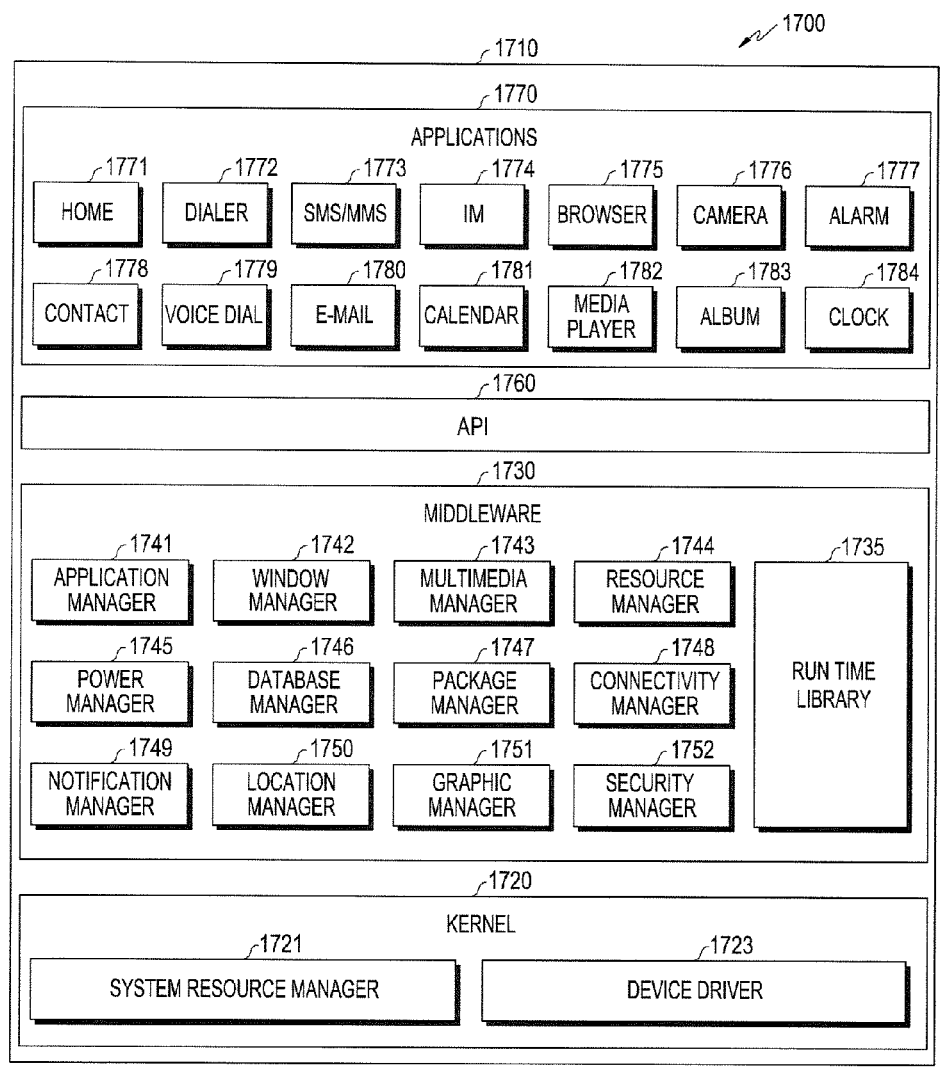
FIG. 17 is a block diagram of an example program module according to this disclosure.

FIG. 17 is a block diagram 1700 of an example program module 1710 according to this disclosure. In an embodiment, the program module 1710 (corresponding to the program 140) includes an OS for controlling resources associated with an electronic device, such as the electronic device 101, or various applications (such as including the application program 147) running under the OS. The OS is ANDROID®, IOS®, WINDOWS®, SYMBIAN®, TIZEN®, BADA®, or like. The program module 1710 includes a kernel 1720, a middleware 1730, an Application Programming Interface (API) 1760, or applications 1770. At least a part of the program module 1710 is preloaded on the electronic device or downloaded from a server, such as the server 106.

The kernel 1720 includes a system resource manager 1721 or a device driver 1723. The system resource manager 1721 performs control allocation or withdrawal of the system resource. In an embodiment, the system resource manager 1721 includes a process manager, a memory manager, a file system manager, or the like. The device driver 1723 includes a display driver, a camera driver, a BLUETOOTH® driver, a shared memory driver, a USB driver, a keypad driver, a Wi-Fi driver, an audio driver, or an Inter-Process Communication (IPC) driver.

The middleware 1730 provides a function commonly used by the applications 1770, or provides the applications 1770 with various functions through the API 1760 for the applications 1770 to efficiently use limited system resources in the electronic device. In an embodiment, the middleware 1730 (corresponding to the middleware 143) includes at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 includes a library module used by a compiler to add a new function through a programming language while the applications 1770 are running. The runtime library 1735 performs input/output management, memory management, or arithmetic functions. The application manager 1741 may manage a life cycle of at least one application among the applications 1770. The window manager 1742 manages GUI resources used for the screen. The multimedia manager 1743 determines a format required to reproduce various media files, and performs encoding or decoding of the media file with a codec that conforms to the format. The resource manager 1744 manages resources, such as source codes of at least one of the applications 1770, memory or storage capacity, or the like.

The power manager 1745 operates with a Basic Input/Output System (BIOS) to manage the battery or power and provide power information required for operation of the electronic device. The database manager 1746 may create, search, or change a database to be used by at least one of the applications 1770. The package manager 1747 manages installing or updating of an application distributed in the form of a package file.

The connectivity manager 1748 manages wireless connection, such as Wi-Fi or BLUETOOTH®. The notification manager 1749 displays or notifies an event, such as message arrival, appointment, proximity, or the like, in a way not to disturb the user. The location manager 1750 manages location information of the electronic device. The graphic manager 1751 manages graphic effects or associated user interface to be provided to the user. The security manager 1752 provides an overall security function required for system security, user authentication, or the like. In an embodiment, if an electronic device, such as the electronic device 101, includes phone functionality, the middleware 1730 further includes a telephony manager to manage voice or video call functions of the electronic device 101.

The middleware 1730 includes a middleware module that constitutes any combination of various functions of the aforementioned components. The middleware 1730 provides a specialized module for each type of OS to provide a specialized function. Furthermore, the middleware 1730 dynamically deletes some of the existing components or adds new components. The API 1760 (corresponding to API 1451) is a set of API programming functions, and is configured differently depending on the OS. For example, in case of ANDROID® or IOS®, an API set is provided per platform, and in case of TIZEN®, two API sets are provided per platform.

The applications 1770 (corresponding to the application program 147) includes one or more applications that provides functions or information about a home 1771, a dialer 1772, SMS/MMS 1773, an Instant Messenger (IM) 1774, a browser 1775, a camera 1776, an alarm 1777, contacts 1778, a voice dial 1779, an email 1780, a calendar 1781, a media player 1782, an album 1783, a clock 1784, healthcare (such as amount of exercise or blood sugar measurement), environmental information (such as atmospheric pressure, temperature, or the like), or the like.

In an embodiment, the applications 1770 include an application that supports exchange of information between electronic devices (such as the electronic device 101 and the external electronic devices 102, 104). The application involved in such information exchange includes a notification relay application for relaying particular information to the external electronic device 104, a charging management application, or a device management application for managing the external electronic device 104.

For example, the notification relay application includes a functionality for notifying the external electronic device such as 102, 104 of notification information generated in any other application (such as the SMS/MMS application, the Email application, the healthcare application, or the environmental information application) of the electronic device 101. For example, the notification relay application receives notification information from an external electronic device and provides the information to the user. The device manager application manages (such as install, delete or update) a function (such as turning on/off an external electronic device 102, 104 itself or a part of the external electronic device, or controlling display brightness of the external electronic device) of the external electronic device in communication with the electronic device such as 101, or a service (such as calling or messaging service) provided by the external electronic device or an application running in the external electronic device. For example, in case of the charging management application, the electronic device 101 runs the charging management application to discover an external electronic device 102 to share electric power with, determines whether to share the electric power with the external electronic device 102, and performs sharing of the electric power.

In an embodiment, the applications 1770 includes an application (such as a healthcare application) designated according to an attribute of the external electronic device 102, 104, and for example, the attribute is a type of the external electronic device, such as the external electronic device has an attribute as a mobile medical device. In an embodiment, the applications 1770 include an application received from the external electronic device, such as the server 106 or the electronic device 102, 104. In an embodiment, the applications 1770 include a preloaded application or a third party application that download from a server. Terms of the components of the program module 1710 depend on types of OS.

In various embodiments, at least a part of the program module 1710 is implemented in software, firmware, hardware, or a combination of two or more of them. At least a part of the programming module 1710 is implemented or run by a processor, such as the processor 1610. At least a part of the programming module 1710 includes such as a module, a program, a routine, a set of instructions, a process, or the like for performing one or more functions. Portability of electronic devices is improved by sharing electric power among electronic devices without carrying accessories, such as separate chargers, extra batteries, charging cable, or the like. Moreover, the embodiments also improve user convenience because electric power is shared irrespective of battery types of the electronic device, such as detachable types, integrated types, or the like, and charging is enabled anytime, anywhere as long as there is an electronic device that shares electric power. Furthermore, efficient power sharing is achieved by allowing the user to set an amount of electric power to be charged per application in the electronic device. In addition, limited electric power of an electronic device to distribute the electric power is efficiently shared by transmitting electric power to an electronic device in need of charging as much as required and terminating the transmission.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sharing, by first electronic device, wireless power with a second electronic device, the method comprising:
   performing connection with the second electronic device;
   obtaining power information of the second electronic device;
   displaying a power state of the second electronic device based on the power information of the second electronic device;
   receiving an input related to an amount of power to be transmitted to the second electronic device among total power stored in a battery of the first electronic device; and
   transmitting the wireless power corresponding to the amount determined based on the input.

2. The method of claim 1, further comprising:
   stopping transmitting the wireless power corresponding to the amount to the second electronic device when the transmission of the wireless power corresponding to the amount is completed.

3. The method of claim 1, wherein the power information includes at least one of an identification of the second electronic device, a battery state of the second electronic device, a consumption power per application based on running time, and a charging efficiency.

4. The method of claim 3, wherein displaying the power state comprises:
   receiving an input for a running time of at least one application of the second electronic device; and calculating an amount of power required to perform for the running time based on the consumption power per application.

5. The method of claim 1, wherein the amount of power to be transmitted is determined by at least one of an amount of the power input by a user, a progress time for transmitting the wireless power, and a transmit strength of the wireless power.

6. The method of claim 5, further comprising:
if the amount of power is input by a user, displaying available running time per application of the second electronic device based on the amount of power.

7. The method of claim 1, wherein the wireless power to the second electronic device is transmitted based on magnetic inductive scheme, magnetic resonant scheme, and electromagnetic wave scheme.

8. The method of claim 1, further comprising:
displaying the amount of power to be transmitted to the second electronic device; and
displaying an available running time of at least one application of the second electronic device based on the amount of the power.

9. The method of claim 1, further comprising:
searching for at least one electronic device to receive electric power from the first electronic device in a short-range wireless communication scheme;
displaying information about the at least one electronic device searched for;
receiving selection of the second electronic device from among the at least one electronic device; and
requesting power information of the second electronic device from the second electronic device when connection with the second electronic device is made.

10. The method of claim 1, further comprising:
when at least one of a user's request for termination of charging occurs, a deviation of the second electronic device from a chargeable range occurs, and an overheating of the second electronic device occurs, terminating power transmission to the second electronic device.

11. A first electronic device for sharing wireless power with a second electronic device, the electronic device comprising:
a communication interface;
a display;
a power transmitter; and
a processor configured to:
perform, using the communication interface, connection with the second electronic device,
obtain, using the communication interface, power information of the second electronic device,
display, on the display, a power state of the second electronic device based on the power information of the second electronic device, and
receive an input related to an amount of power to be transmitted to the second electronic device among total power stored in a battery of the first electronic device; and
transmitting, using the power transmitter, the wireless power corresponding to the amount determined based on the input.

12. The first electronic device of claim 11, wherein the processor is further configured to stop transmitting the wireless power corresponding to the amount to the second electronic device when the transmission of the wireless power corresponding to the amount is completed.

13. The first electronic device of claim 11, wherein the power information includes at least one of an identification of the second electronic device, a battery state of the second electronic device, a consumption power per application based on running time, and a charging efficiency.

14. The first electronic device of claim 13, wherein the processor is further configured to:
receive an input for a running time of at least one application of the second electronic device,
calculate an amount of electric power required to perform for the running time based on the consumption power per application; and
transmit wireless power corresponding to the calculated amount of power.

15. The first electronic device of claim 11, wherein the amount of the power to be transmitted is determined by at least one of an amount of the power input by a user, a progress time for transmitting the wireless power, and a transmit strength of the wireless power.

16. The first electronic device of claim 15, wherein the processor is further configured to:
display available running time per application of the second electronic device based on the amount of the power when the amount of power is input by a user.

17. The first electronic device of claim 11, wherein the processor is further configured to:
display the amount of power to be transmitted to the second electronic device; and
display available running time per application of the second electronic device based on the amount of the power.

18. The first electronic device of claim 11, wherein the processor is configured to:
search for at least one electronic device to receive electric power from the first electronic device through the communication interface;
display information about the at least one electronic device searched for; and
receive a selection of the second electronic device from among the at least one electronic device displayed on the display.

19. The first electronic device of claim 11, wherein the processor is configured to:
when the first electronic device is connected to the second electronic device, request power information of the second electronic device to the second electronic device.

20. The first electronic device of claim 11, wherein the processor is further configured to:
when at least one of a user's request for termination of charging occurs, a deviation of the second electronic device from a chargeable range occurs, and an overheating of the second electronic device occurs, terminate power transmission to the second electronic device.

* * * * *